US012578595B2

(12) United States Patent
Richlich et al.

(10) Patent No.: US 12,578,595 B2
(45) Date of Patent: Mar. 17, 2026

(54) ELECTRO-OPTIC ASSEMBLY

(71) Applicant: GENTEX CORPORATION, Zeeland, MI (US)

(72) Inventors: Stephen F. Richlich, Holland, MI (US); Gerald W. Redwine, Holland, MI (US); Donald L. Bareman, Zeeland, MI (US); David J. Cammenga, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 466 days.

(21) Appl. No.: 18/115,824

(22) Filed: Mar. 1, 2023

(65) Prior Publication Data

US 2023/0280603 A1      Sep. 7, 2023

Related U.S. Application Data

(60) Provisional application No. 63/315,608, filed on Mar. 2, 2022.

(51) Int. Cl.
| | |
|---|---|
| G02F 1/161 | (2006.01) |
| B60J 7/043 | (2006.01) |
| G02F 1/00 | (2006.01) |
| G02F 1/03 | (2006.01) |

(52) U.S. Cl.
CPC ............ G02F 1/0018 (2013.01); B60J 7/043 (2013.01); G02F 1/0305 (2013.01)

(58) Field of Classification Search
CPC ......... G02F 1/161; G02F 1/153; G02F 1/1533
See application file for complete search history.

(56) References Cited

U.S. PATENT DOCUMENTS

| | | | | |
|---|---|---|---|---|
| 4,761,061 | A | * | 8/1988 | Nishiyama .............. G02F 1/161 |
| | | | | 359/265 |
| 7,808,603 | B2 | | 10/2010 | Rudin |
| 2010/0321758 | A1 | | 12/2010 | Bugno et al. |
| 2013/0164486 | A1 | | 6/2013 | Yamada et al. |

FOREIGN PATENT DOCUMENTS

| | | | | |
|---|---|---|---|---|
| CN | 113759616 | A | | 12/2021 |
| JP | 4678075 | B2 | | 4/2011 |
| WO | 2016040730 | A1 | | 3/2016 |
| WO | WO2016040730 | | * | 3/2016 ............. G02F 1/161 |

* cited by examiner

*Primary Examiner* — Joseph P Martinez
(74) *Attorney, Agent, or Firm* — Price Heneveld LLP; Brian James Brewer

(57) ABSTRACT

An electro-optic assembly comprises a first substrate and a second substrate. The first and second substrates are disposed in a parallel and spaced apart relationship so as to define a cavity therebetween. A primary seal extends between the first and second substrates. An electro-optic medium is located in the cavity and retained in an inboard direction by the primary seal. A plurality of first spacer elements are coupled to the primary seal. A break wall is located in the inboard direction or an outboard direction from the primary seal. The break wall extends between the first and second substrates and generally along the primary seal. A plurality of second spacer elements are coupled to the break wall. A space is defined between the primary seal and the break wall in the inboard-outboard directions.

20 Claims, 5 Drawing Sheets

10

12, 13D 12, 13D 12, 13C 12, 13A 12, 13B 12, 13B

ELECTRO-OPTIC ASSEMBLY

CROSS-REFERENCE TO RELATED APPLICATION

This application claims priority to and the benefit under 35 U.S.C. § 119(e) of U.S. Provisional Application No. 63/315,608, filed on Mar. 2, 2022, entitled "ELECTRO-OPTIC ASSEMBLY," the disclosure of which is hereby incorporated herein by reference in its entirety.

FIELD OF THE DISCLOSURE

The present disclosure generally relates to an electro-optic assembly, and, more particularly, to an electro-optic assembly including a uniform cell spacing.

SUMMARY OF THE DISCLOSURE

According to one aspect of the present disclosure, an electro-optic assembly is provided. The electro-optic assembly comprises a first substrate having a first surface and a second surface that is opposite the first surface. A second substrate has a third surface and a fourth surface that is opposite the third surface. The first and second substrates are disposed in a parallel and spaced apart relationship so as to define a cavity therebetween. The second and third surfaces face each other. A primary seal extends between the first and second substrates. An electro-optic medium is located in the cavity and retained in an inboard direction by the primary seal. A plurality of first spacer elements are coupled to the primary seal. A break wall is located in the inboard direction or an outboard direction from the primary seal. The break wall extends between the first and second substrates and generally along the primary seal. A plurality of second spacer elements are coupled to the break wall. A space is defined between the primary seal and the break wall in the inboard-outboard directions.

According to another aspect of the present disclosure, an electro-optic assembly is provided. The electro-optic assembly comprises a first substrate having a first surface and a second surface that is opposite the first surface. A second substrate has a third surface and a fourth surface that is opposite the third surface. The first and second substrates are disposed in a parallel and spaced apart relationship so as to define a cavity therebetween. The second and third surfaces face each other. A primary seal extends between the first and second substrates generally along a perimeter of the first and second substrates. An electro-optic medium is located in the cavity and retained in an inboard direction by the primary seal. A plurality of first spacer elements are coupled to the primary seal. A break wall is located in the inboard direction or an outboard direction from the primary seal. The break wall extends between the first and second substrates and generally along the perimeter of the first and second substrates. A plurality of second spacer elements are coupled to the break wall. An opaque material covers visibility of the primary seal and the break wall in a direction from the second surface opposite the cavity or in a direction from the third surface opposite the cavity.

According to yet another aspect of the present disclosure, an electro-optic assembly is provided. The electro-optic assembly comprises a first substrate having a first surface and a second surface that is opposite the first surface. A second substrate has a third surface and a fourth surface that is opposite the third surface. The first and second substrates are disposed in a parallel and spaced apart relationship so as to define a cavity therebetween. The second and third surfaces face each other. A primary seal extends between the first and second substrates generally along a perimeter of the first and second substrates. An electro-optic medium is located in the cavity and retained in an inboard direction by the primary seal. A plurality of first spacer elements are coupled to the primary seal. A break wall is located in the inboard direction or an outboard direction from the primary seal. The break wall extends between the first and second substrates and generally along the perimeter of the first and second substrates. A plurality of second spacer elements are coupled to the break wall. The first spacer elements define a first thickness and the second spacer elements define a second thickness, where the first thickness and the second thickness are each greater than 30 microns.

These and other features, advantages, and objects of the present invention will be further understood and appreciated by those skilled in the art by reference to the following specification, claims, and appended drawings.

DETAILED DESCRIPTION

Figure 1:
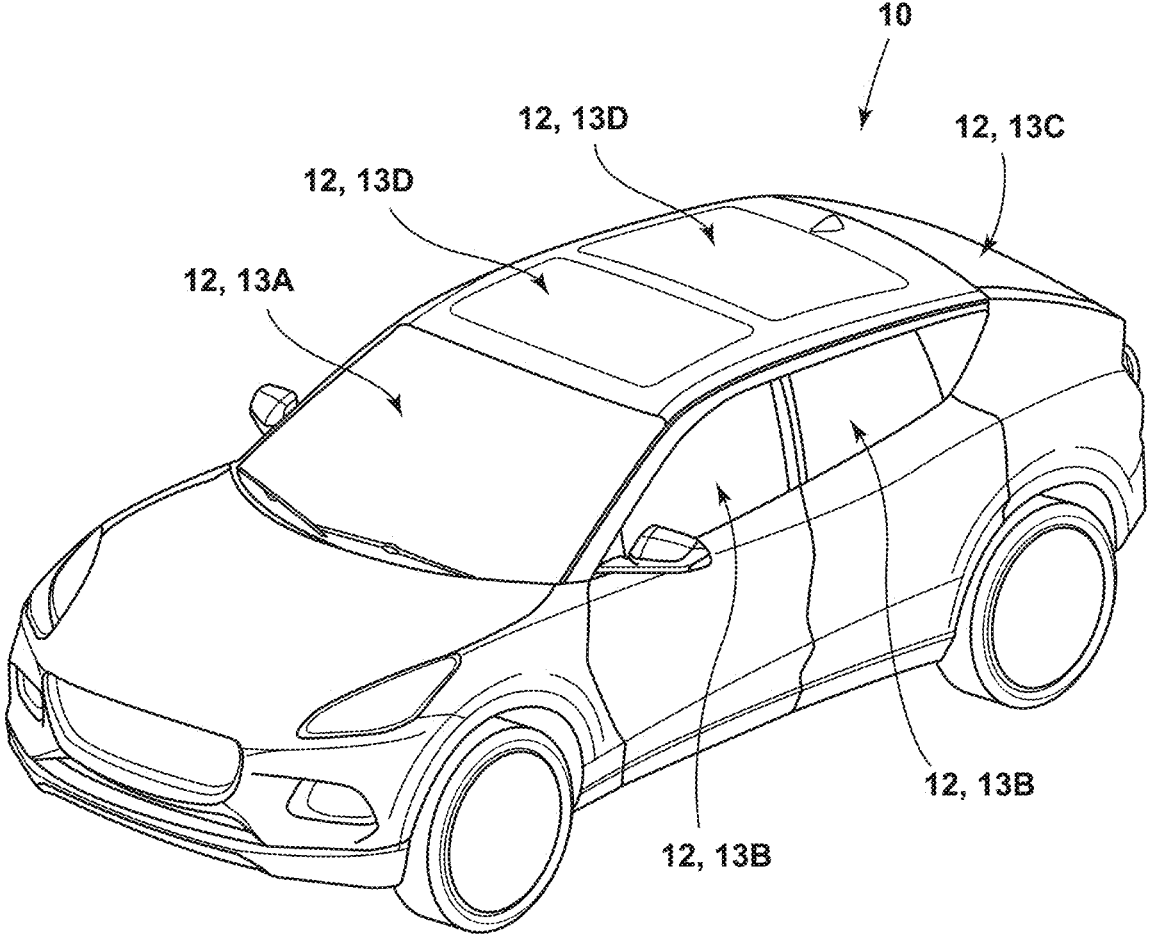
FIG. 1 is a top perspective view of a vehicle that includes an electro-optic assembly according to the present disclosure.

The present illustrated embodiments reside primarily in combinations of method steps and apparatus components related to an electro-optic assembly with a uniform cell spacing. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to a surface of the device closest to an intended viewer, and the term "rear" shall refer to a surface of the device furthest from the intended viewer. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

The present disclosure is generally related to an electro-optic system that includes numerous window and mirror applications. The electro-optic system includes an electro-optic assembly having a pair of opposing substrates and at least two paths located between the opposing substrates that comprise spacer elements generally along a peripheral edge of a transmission perimeter of a variably transmissive element. The disclosure, as set forth herein, provides an improved uniformity in cell spacing permitting a reliably consistent darkening and clearing of the electro-optic assembly. In addition, the electro-optic assembly reduces internal stress induced during a sealing and curing process and generally improves end user experience by covering the at least two paths that comprise the spacer elements such that they are not visible.

Figure 2:
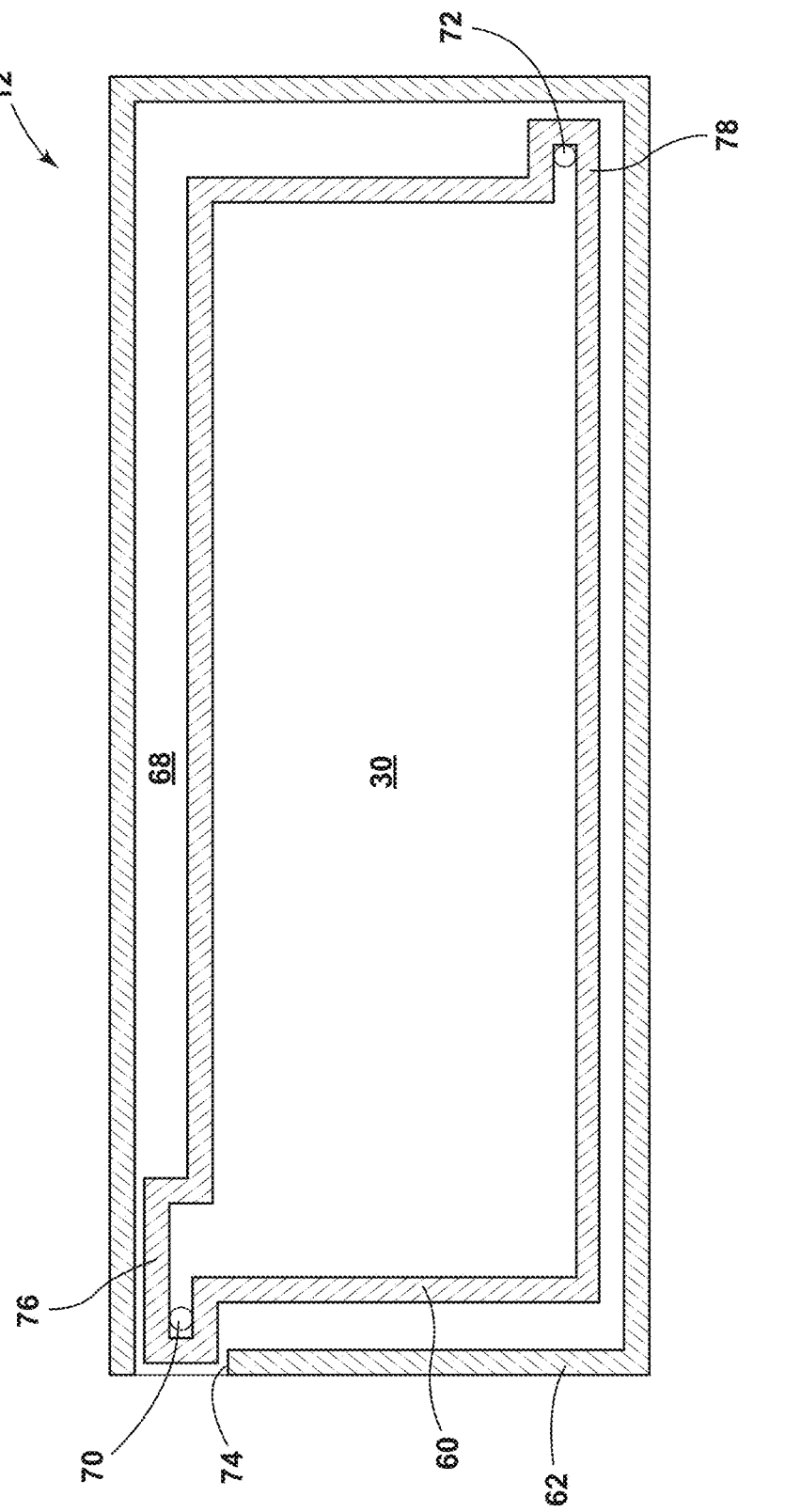
FIG. 2 is a top schematic profile view of an electro-optic assembly according to the present disclosure.
Figure 3:
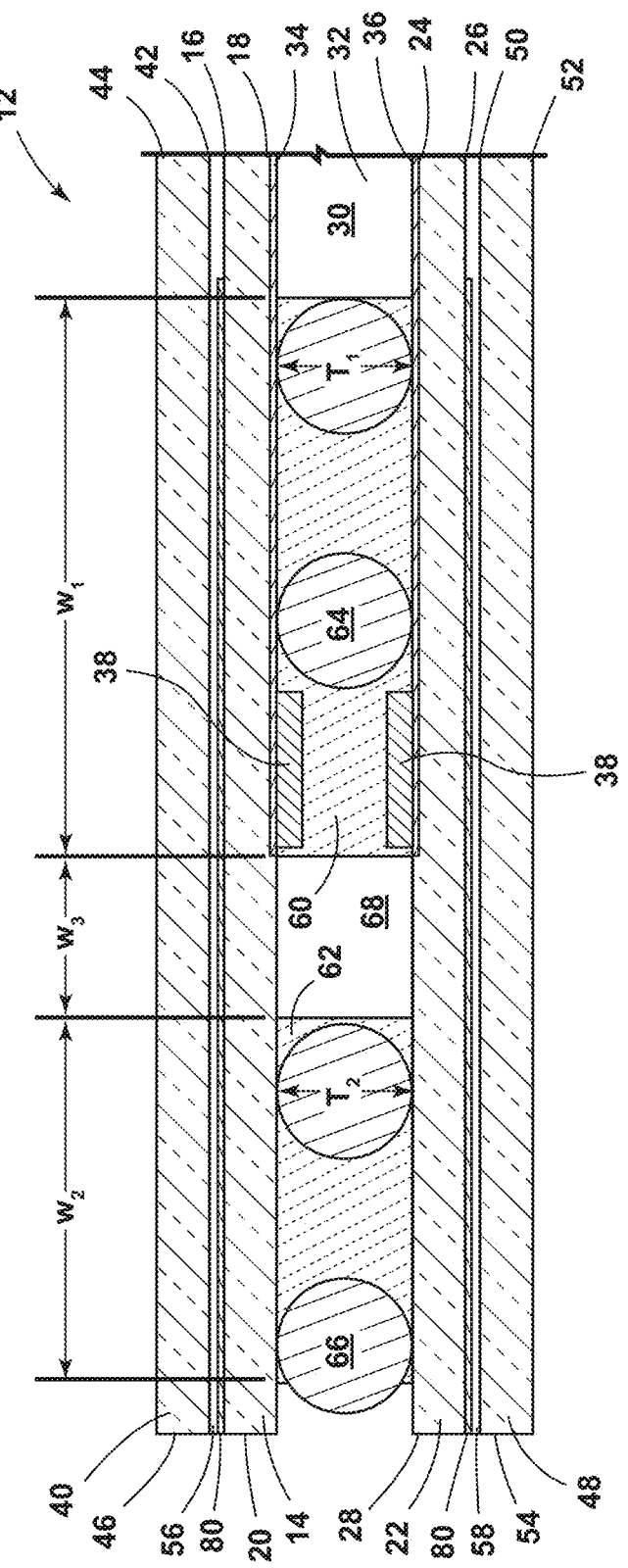
FIG. 3 is a cross-sectional view of the electro-optic assembly according to the present disclosure.

With initial reference to FIGS. 1-3, reference numeral 10 generally designates a vehicle with an electro-optic assembly 12. In various embodiments, the electro-optic assembly 12 may be implemented in one or more windows 13A-13D, such as a front window 13A, side window 13B, rear window 13C, or sunroof 13D. However, it should be appreciated that the electro-optic assembly 12 may be implemented in a display device, lens, mirror, and/or a variety of other applications that may benefit from varying a transmittance of light through the variably transmissive element. The embodiments shown in the drawings are depicted with generally flat substrates, however, it is understood that the disclosure is not limited to flat substrates. The substrates may be flat, bent, curved, or combinations of these shapes without deviating from the spirit of the disclosure. The electro-optic assembly 12 includes a first substrate 14 defining a first surface 16, a second surface 18, and a first peripheral edge 20. The first substrate 14 may be substantially transparent. The electro-optic assembly 12 also includes a second substrate 22 defining a third surface 24, a fourth surface 26, and a second peripheral edge 28. The second substrate 22 may be substantially transparent. The first and second substrates 14, 22 are disposed in a parallel and spaced apart relationship.

With reference now to FIGS. 2 and 3, the first and second substrates 14, 22 define a cavity 30 (e.g., a cell) therebetween. An electro-optic medium 32 at least partially fills the cavity 30 and is configured to reduce light transmissivity. When the electro-optic assembly 12 is implemented in a mirror, the variable transmission through the electro-optic medium results in a change in reflectivity. In this manner, the electro-optic medium 32 may be a solution-phase, electrochromic medium. A first electrode layer 34 may be disposed on the second surface 18 of the first substrate 14, and a second electrode layer 36 may be disposed on the third surface 24 of the second substrate 22. In other words, the first electrode layer 34 and the second electrode layer 36 may be located on internal surfaces of the first and second substrates 14, 22 to at least partially delimit the cavity 30 and interface with the electro-optic medium 32. The first electrode layer 34 and the second electrode layer 36 may be formed by electrically conductive transparent materials, including, but not limited to, a transparent metal oxide (e.g., indium tin oxide, F:SnO$_2$, ZnO, IZO), IMI Structures, carbon (graphene and/or graphite) and/or a conductive metal mesh (e.g., nanowires).

In various examples, the electro-optic medium 32 may include at least one solvent, at least one anodic material, and at least one cathodic material. Typically, both of the anodic and cathodic materials are electroactive and at least one of them may be electrochromic. It will be understood that regardless of its ordinary meaning, the term "electroactive" may mean a material that undergoes a modification in its oxidation state upon exposure to a particular electrical potential difference. Additionally, it will be understood that the term "electrochromic" may mean, regardless of its ordinary meaning, a material that exhibits a change in its extinction coefficient at one or more wavelengths upon exposure to a particular electrical potential difference.

An electric bus 38 may at least partially travel along a peripheral edge of the cavity 30. For example, the electric bus 38 may include a conductive adhesive, tape, and/or the like, that may include a higher electric conductivity than one of or both of the first electrode layer 34 and the second electrode layer 36. The electric bus 38 may be placed on an internal surface (e.g., a surface that faces towards the cavity 30) of the first electrode layer 34 and/or the second electrode layer 36, or the electric bus 38 may be placed on an outer surface (e.g., a surface that faces away from the cavity 30) of the first electrode layer 34 and/or the second electrode layer 36. In some instances, the electric bus 38 may transverse an entire perimeter of the cavity 30 or may be localized to one or more discrete locations.

With continued reference to FIGS. 2 and 3, the electro-optic assembly 12 may include a third substrate 40 defining a fifth surface 42, a sixth surface 44 opposite the fifth surface 42, and a third peripheral edge 46. The third substrate 40 may be substantially transparent. The electro-optic assembly 12 may also include a fourth substrate 48 defining a seventh surface 50, an eighth surface 52 opposite the seventh surface 50, and a fourth peripheral edge 54. The fourth substrate 48 may be substantially transparent. In some instances, a first laminate layer 56 may be located between the third substrate 40 and the first substrate 14, and a second laminate layer 58 may be located between the fourth substrate 48 and the second substrate 22. The first and second laminate layers 56, 58 may comprise a thermoplastic polyurethane ("TPU"), polyvinyl butyral ("PVB"), an elastomeric polymer such as ethylene vinyl acetate ("EVA"), or other film-based or liquid-laminating materials. The third substrate 40 may be located outwardly from the first substrate 14 (e.g., away from the cavity 30 and facing towards the first surface 16), and the fourth substrate 48 may be located outwardly from the second substrate 22 (e.g., away from the cavity 30 and facing towards the third surface 24). One or more of the substrates 14, 22, 40, 48 may comprise glass (e.g., soda-lime glass or borosilicate glass), plastics, and/or the like.

Figure 5:
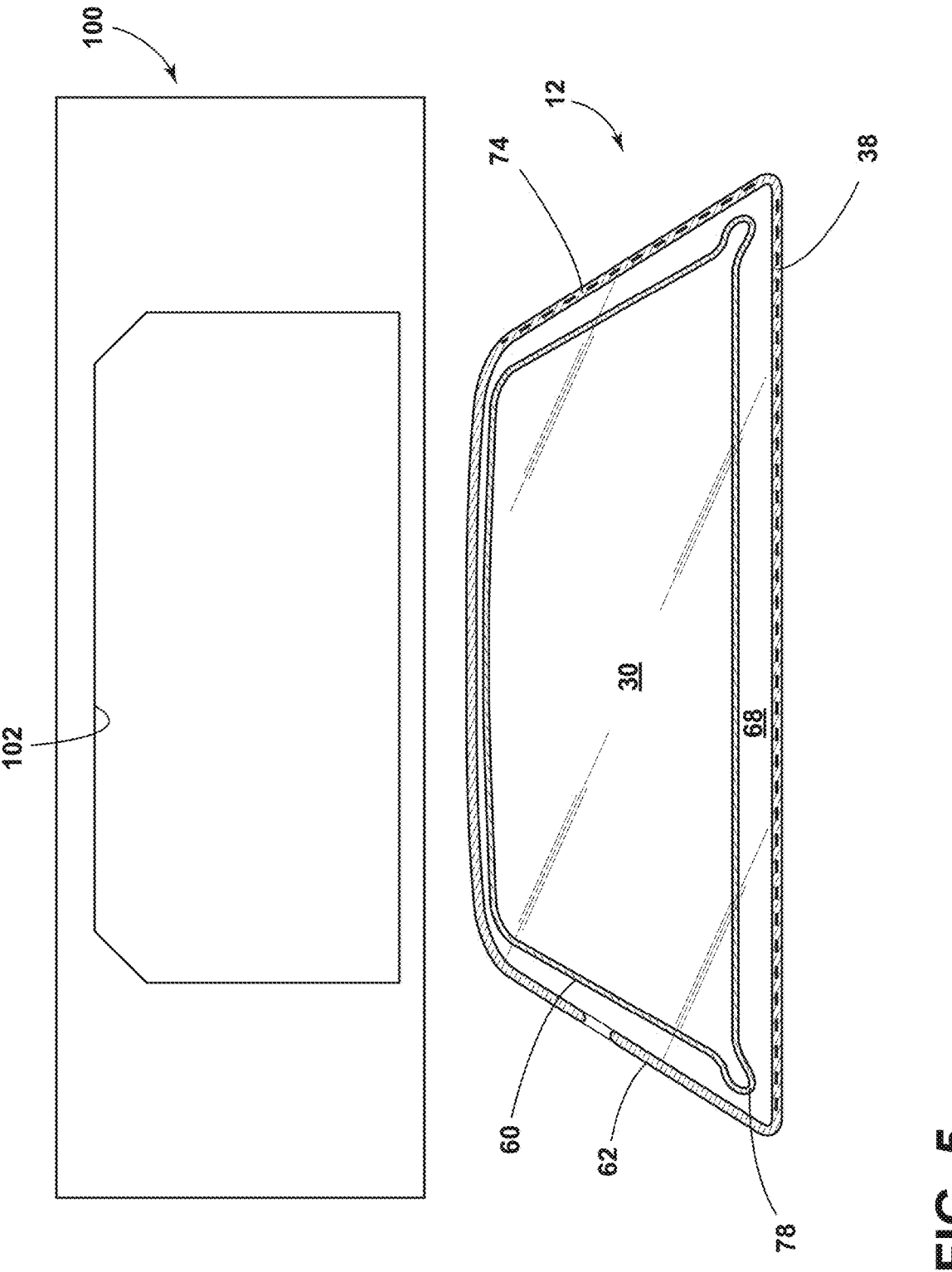
FIG. 5 is a top profile view of an electro-optic assembly according to the present disclosure for a sunroof assembly of an automobile.

The electro-optic assembly 12 includes at least two paths located between the first substrate 14 and the second substrate 22. The at least two paths comprise spacer elements. As illustrated in FIG. 2, the at least two paths may include a primary seal 60 and a break wall 62 spaced in an inboard-outboard direction. The primary seal 60 may include a substantially continuous line outlining a periphery of the cavity 30 to retain the electro-optic medium 32 between the first substrate 14 and the second substrate 22 in an inboard direction. The primary seal 60, therefore, may define a transmission perimeter of the electro-optic medium 32. In other words, the transmission perimeter delimits the shape of the electro-optic assembly 12 that can change transmissibility. The primary seal 60 may have a seal medium, such as an epoxy, and a plurality of first spacer elements 64 may be coupled to (e.g., encapsulated, semi-encapsulated, adhered to, or combinations thereof) the seal medium. In some embodiments, the primary seal 60 may substantially cover and/or be aligned with the electric bus 38 (FIG. 3). In some embodiments, the break wall 62 may substantially cover and/or be aligned with the electric bus 38 (FIG. 5). While FIG. 5 only illustrates the electric bus 38 extending along a portion of the break wall 62, it should be appreciated that the electric bus 38 may extend along substantially all of the break wall 62 and/or be continuous around the parameter. The break wall 62 may also be formed of a substantially continuous line and include a break wall material, and a plurality of second spacer elements 66 may be coupled to (e.g., encapsulated, semi-encapsulated, adhered to, or combinations thereof) the break wall material.

The break wall material may comprise the same or different materials as the primary seal material and may further exhibit the same concentration or different concentrations of spacer elements 64, 66. In some embodiments, the break wall material may comprise an ultraviolet ("UV") curable material, such as adhesive. The spacer elements 64, 66 may be spherical or semi-spherical beads, pads, rods, fibers, or any known shape. The spacer elements 64, 66 may be formed of glass materials, salt materials, polymeric materials, and/or the like. In some embodiments, the first spacer elements 64 may have the same or different size than the second spacer elements 66 for a controlled wedging during a curing process of at least the primary seal 60. In some embodiments, the break wall material and the spacer medium may comprise the same materials and include the same concentration and size of spacer elements 64, 66 such that they can be dispensed from the same source to simplify production. The spacer elements 64, 66 may be located in the break wall material and/or the spacer medium prior to or after deposition of the mediums on the electro-optic assembly 12.

With reference to FIG. 3, the primary seal 60 may define a first inboard-outboard width ("W$_1$") and the break wall 62 may define a second inboard-outboard width ("W$_2$") that are substantially equal to further simplify production via reuse of the same depositing tool. In some embodiments, the inboard-outboard widths are less than 15 mm, less than 10 mm, less than 8 mm, or between 5 and 15 mm. A space 68 may be defined between the primary seal 60 and the break wall 62 that includes an inboard-outboard width ("W$_3$") measurement that is greater than the inboard-outboard width of the primary seal 60, the break wall 62, or an aggregation of the primary seal 60 and the break wall 62. In some embodiments, the space 68 may have an inboard-outboard measurement that is 50 mm or less, 40 mm or less, or 30 mm or less. The inboard-outboard measurement of the space 68 may be substantially uniform. It should be appreciated that increasing the size of the space 68 (e.g., enlarging the spacer element 64, 66 platform) improves uniformity.

The spacer elements 64, 66 may define a thickness "T" to define or substantially define a depth of the cavity 30. In some embodiments, the thickness of the spacer elements 64, 66 may be greater than 25 microns, for example, greater than 50 microns, greater than 100 microns, or 350 microns to 450 microns. In some embodiments, the thickness of the spacer elements 64, 66 may be 400 microns. As previously noted, the spacer elements 64 in the primary seal 60 may define a first thickness "T$_1$" and the spacer elements 66 in the break wall 62 may define a second thickness "T$_2$". In some embodiments, the first thickness "T$_1$" is different than the second thickness "T$_2$". For example, whichever of the primary seal 60 and the break wall 62 is located furthest outboard, the associated spacer element 64, 66 may define a smaller thickness than those located inboard to provide an inward wedge. In other examples, it may be beneficial for whichever of the primary seal 60 and the break wall 62 is located furthest outboard, that the associated spacer elements 64, 66 may define a larger thickness than those located inboard to provide an outward wedge. In some embodiments, the differences of the first thickness and the second thickness may be greater than 1 micron, for example, greater than 5 microns, greater than 10 microns, or greater than 20 microns. In some embodiments, the first thickness "T$_1$" and the second thickness "T$_2$" may have relative size differences equal or less than 10%, equal or less than 5%, between 2% and 8%, or more than 1%, where the first thickness "T$_1$" is greater or less than the second thickness "T$_2$".

As illustrated in FIGS. 2 and 3, the break wall 62 is located outboard from the primary seal 60. In other words, the break wall 62 is not located within the cavity 30 or exposed to the electro-optic medium 32. In this configuration, the inboard located primary seal 60 confines the electro-optic medium 32 to a smaller space to form a smaller transmission perimeter such that a reduced quantity of electro-optic medium 32 needs to be activated thereby permitting faster changes in transmissibility and a reduction in required energy to operate. As best illustrated in FIG. 2, a fill port 70 is located in the primary seal 60 such that, during assembly, the electro-optic medium 32 can be injected therethrough and into the cavity 30. A release opening 72 may optionally be located in the primary seal 60 for allowing gas to escape the cavity 30 as it is filled. The break wall 62 includes at least one gap 74 for permitting the escaped gas to exit the electro-optic assembly 12. It should, however, be appreciated that the fill port 70 and the release opening 72 may be provided in alternative locations in the electro-optic assembly 12. For example, the fill port 70 and/or the release opening 72 may be located through one or more of the substrates 14, 22, 40, 48. It should also be appreciated that the fill port 70 and the release opening 72 may be defined by the same aperture.

With continued reference to FIGS. 2 and 3, the primary seal 60 may define a fill port path 76 (FIG. 2) that extends in the outboard direction such that any discoloration as a result of oxidization during the fill process is hidden under an opaque material (e.g., a frit) when the electro-optic assembly 12 is installed for end-use. The primary seal 60 may further define a terminal path 78 that extends in the outboard direction such that any small bubbles formed during the fill process are hidden from view. In some embodiments, the release opening 72 may extend into the terminal path 78. The at least one gap 74 of the break wall 62 may include a plurality of gaps 74. The gaps 74 may have substantially the same size and be located symmetrically and/or uniformly. In some embodiments, the gaps 74 define a majority of the break wall path, such that break wall material is deposited in a dotted pattern. In other embodiments, the gaps 74 define a minority of the break wall path, such that break wall material is substantially continuous to define a predominately closed path (e.g., an uninterrupted closed shape without any terminal ends). For example, a ratio between the break wall material and the gaps 74 along the break wall path may be at least 50% break wall material; for example, at least 60% break wall material, at least 70% break wall material, at least 80% break wall material, at least 90% break wall material, or at least 95% break wall material to impose uniformity during the curing process.

With continued reference to FIGS. 2 and 3, in some embodiments, the break wall 62 may be completely or substantially continuous (e.g., without the gap 74 other than that necessary to inject the electro-optic medium 32 if the electro-optic medium 32 is injected through a fill port 70 in the primary seal 60) to provide a secondary sealing functionality. The substantially continuous break wall 62 further prevents laminate material from entering between the first substrate 14 and the second substrate 22 during the lamination process. The at least one gap 74 may be generally aligned with the fill port 70 to provide access to mechanical parts during the fill process. While the inboard-outboard measurement of the space 68 may remain substantially uniform, it should be appreciated that there may be some deviation around the fill port path 76 and the terminal path 78. For example, the inboard-outboard measurement of the space 68 may be smaller therealong and not considered in the example of inboard-outboard measurements provided above. In embodiments where the break wall 62 provides a secondary seal functionality, the space 68 between the primary seal 60 and the break wall 62 may be filled with a fill medium, such as the electro-optic medium 32, a gel, the solvent used in the electro-optic medium 32 without the anodic and cathodic additives, and/or the like.

The substrates 14, 22, 40, 48, the primary seal material of the primary seal 60, the break wall material of the break wall 62, and the spacer elements 64, 66 may each have a coefficient of thermal expansion ("CTE"). In some embodiments, the CTE of the primary seal material is greater than the CTE of the substrates 14, 22, 40, 48, for example, by a multiple of 2, a multiple of 4, a multiple of 6, a multiple of 8, or a multiple of 10. In embodiments where the primary seal material and/or the break wall material is epoxy, the CTE of the epoxy may be about 150 parts-per million per degree Celsius at a temperature above the glass transition temperature and about 50 parts-per million per degree Celsius at a temperature below the glass transition temperature. It should be appreciated that the above-noted CTE of the primary seal 60 and the break wall 62 do not account for the spacer elements 64, 66, which may reduce the overall CTE. In some embodiments, one or more of the substrates 14, 22, 40, 48 is formed of Soda Lime glass, which has a CTE of about 9.5 ppm/C°. In some embodiments, one or more of the substrates 14, 22, 40, 48 is formed of Borosilicate glass, which has a CTE of about 5 ppm/C°. In some embodiments, the epoxy may have a CTE after curing of about 149 ppm/C° for temperatures above the glass transition or 51 ppm/C° for temperatures below the glass transition. Accordingly, in some embodiments, to obtain a high glass transition, the epoxy is cured at a temperature higher than the glass transition, for example, higher than about 140° C. Because the CTE of the epoxy (below the glass transition) may be higher than that of the substrates 14, 22, 40, 48, the seal material (primary seal 60 and/or break wall 62) shrinks more than the substrates 14, 22, 40, 48 and that results in stress. The stress causes non-uniformity in the cell spacing. Thus, adding the break wall 62 reduces the non-uniformity.

Figure 4:
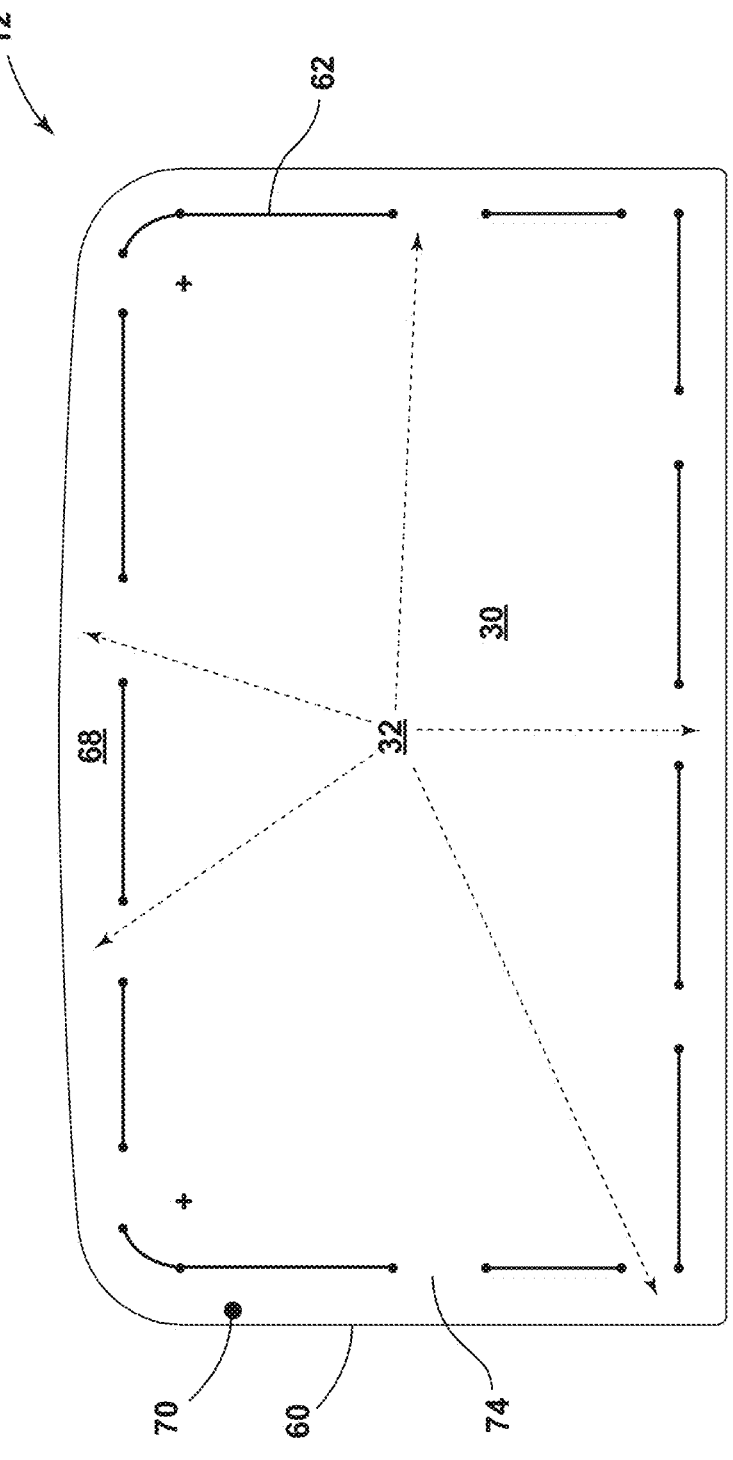
FIG. 4 is a top schematic profile view of an electro-optic assembly according to another aspect of the present disclosure.

With reference now to FIG. 4, the electro-optic assembly 12 is illustrated with the primary seal 60 located outboard from the break wall 62. Unless otherwise indicated, this arrangement includes all of the same features, spatial relationships, materials, and elements as those aforedescribed in reference to FIGS. 2 and 3. By locating the primary seal 60 on the outboard side, the primary seal 60 will prevent laminate material from entering between the first substrate 14 and the second substrate 22 during the lamination process. It should be appreciated that, in the illustrated embodiment, the electro-optic medium 32 extends into the space 68 and is confined by the primary seal 60 on the outboard side.

Regardless of the primary seal 60 and the break wall 62 inboard-outboard placement, an opaque material 80 (FIG. 3) may be located on one or more of the substrates 14, 22, 40, 48 to cover the primary seal 60 and break wall 62 from end-consumer view. The opaque material 80 is illustrated as being raised from the substrates 20, 22. However, it should be appreciated that the opaque material 80 may be formed into or integral with any of the substrates 14, 22, 40, 48 so as to remain substantially flush therewith. The opaque material 80 covers visibility of the primary seal 60 and the break wall 62 in a direction from the second surface 18 opposite the cavity 30 and in a direction from the third surface 24 opposite the cavity 30. In other words, the opaque material 80 may be located on the first substrate 14 or third substrate 40 and the second substrate 22 or fourth substrate 48, with the primary seal 60 and break wall 62 sandwiched therebetween. The opaque material 80 may be a glass frit that is integral with one or more of the substrates 14, 22, 40, 48. In other embodiments, the opaque material 80 may be non-integral. The opaque material 80 may cover the entirety or part of the primary seal 60 and the break wall 62. For example, in some embodiments, the opaque region may not cover a portion of the fill port path 76 and/or the terminal path 78.

Referring to FIG. 5, the electro-optic assembly 12 may be part of a sunroof assembly 100 (e.g., the sunroof 13D) of the vehicle 10. The sunroof assembly 100 may include a frame 102 for locating the electro-optic assembly 12. The frame 102 may cover the entirety, part, or none of the opaque material 80 depending on end-use requirements and vehicular architecture, such as opening and closing mechanisms of the sunroof assembly 100.

The electro-optic assembly 12 as described herein may be configured for any number of end-use applications including, but not limited to, consumer goods, architecture, and vehicles. While the electro-optic assembly 12 is illustrated as being incorporated into the vehicle 10, the electro-optic assembly 12 may be incorporated into other structures. For example, the electro-optic assembly 12 may be incorporated into a multi-passenger automobile (e.g., a bus), an aircraft, a water vessel, and/or any other environments where changing the transmissibility of a window or mirror may be useful. It should be appreciated that one or more of the substrates 14, 22, 40, 48 may include a reflector element (e.g., a reflective layer) on one side of the electro-optic medium 32 to provide a mirror functionality with dimming options. Whichever of the primary seal 60 and the break wall 62 is located outboard, it may be located at least partially inboard of the peripheral edges of the substrates 14, 22, 40, 48 as it travels generally along the perimeter.

The invention disclosed herein is further summarized in the following paragraphs and is further characterized by combinations of any and all of the various aspects described therein.

According to one aspect of the present disclosure, an electro-optic assembly is provided. The electro-optic assembly comprises a first substrate having a first surface and a second surface that is opposite the first surface. A second substrate has a third surface and a fourth surface that is opposite the third surface. The first and second substrates are disposed in a parallel and spaced apart relationship so as to define a cavity therebetween. The second and third surfaces face each other. A primary seal extends between the first and second substrates. An electro-optic medium is located in the cavity and retained in an inboard direction by the primary seal. A plurality of first spacer elements are coupled to the primary seal. A break wall is located in the inboard direction or an outboard direction from the primary seal. The break wall extends between the first and second substrates and generally along the primary seal. A plurality of second spacer elements are coupled to the break wall. A space is defined between the primary seal and the break wall in the inboard-outboard directions.

According to another aspect of the present disclosure, an opaque material covers visibility of a primary seal and a break wall in a direction from a second surface opposite a cavity and in a direction from a third surface opposite the cavity.

According to yet another aspect of the present disclosure, an opaque material is a glass frit.

According to still another aspect of the present disclosure, a primary seal comprises a primary seal material and a break wall comprises a break wall material that is the same as the primary seal material.

According to another aspect of the present disclosure, a primary seal material and a break wall material comprise one or more epoxy materials.

According to yet another aspect of the present disclosure, first spacer elements define a first thickness and second spacer elements define a second thickness, where the first thickness and the second thickness are each greater than 30 microns.

According to still another aspect of the present disclosure, a first thickness and a second thickness are each greater than 350 microns.

According to another aspect of the present disclosure, a first thickness is different than a second thickness.

According to yet another aspect of the present disclosure, a break wall is substantially continuous and defines at least a 90% closed path.

According to still another aspect of the present disclosure, a primary seal is located inboard from a break wall.

According to another aspect of the present disclosure, an electro-optic medium comprises at least one solvent, at least one anodic material, and at least one cathodic material.

According to yet another aspect of the present disclosure, a primary seal is located outboard from a break wall.

According to still another aspect of the present disclosure, a first substrate and a second substrate comprise glass and a primary seal has a coefficient of thermal expansion ("CTE") that is greater than a CTE of the first substrate and the second substrate by a multiple of at least 2.

According to another aspect of the present disclosure, an electro-optic assembly is provided. The electro-optic assembly comprises a first substrate having a first surface and a second surface that is opposite the first surface. A second substrate has a third surface and a fourth surface that is opposite the third surface. The first and second substrates are disposed in a parallel and spaced apart relationship so as to define a cavity therebetween. The second and third surfaces face each other. A primary seal extends between the first and second substrates generally along a perimeter of the first and second substrates. An electro-optic medium is located in the cavity and retained in an inboard direction by the primary seal. A plurality of first spacer elements are coupled to the primary seal. A break wall is located in the inboard direction or an outboard direction from the primary seal. The break wall extends between the first and second substrates and generally along the perimeter of the first and second substrates. A plurality of second spacer elements are coupled to the break wall. An opaque material covers visibility of the primary seal and the break wall in a direction from the second surface opposite the cavity and in a direction from the third surface opposite the cavity.

According to yet another aspect of the present disclosure, a space is defined between a primary seal and a break wall and a fill medium located in the space defined between the primary seal and the break wall.

According to still another aspect of the present disclosure, a primary seal defines a first inboard-outboard width and a break wall defines a second inboard-outboard width that is substantially equal to the first inboard-outboard width.

According to another aspect of the present disclosure, a space defines an inboard-outboard width that is greater than a first inboard-outboard width and a second inboard-outboard width, individually.

According to yet another aspect of the present disclosure, an inboard-outboard width of a space is greater than a first inboard-outboard width and a second inboard-outboard width, in aggregate.

According to still another aspect of the present disclosure, an electro-optic assembly is provided. The electro-optic assembly comprises a first substrate having a first surface and a second surface that is opposite the first surface. A second substrate has a third surface and a fourth surface that is opposite the third surface. The first and second substrates are disposed in a parallel and spaced apart relationship so as to define a cavity therebetween. The second and third surfaces face each other. A primary seal extends between the first and second substrates generally along a perimeter of the first and second substrates. An electro-optic medium is located in the cavity and retained in an inboard direction by the primary seal. A plurality of first spacer elements are coupled to the primary seal. A break wall is located in the inboard direction or an outboard direction from the primary seal. The break wall extends between the first and second substrates and generally along the perimeter of the first and second substrates. A plurality of second spacer elements are coupled to the break wall. The first spacer elements define a first thickness and the second spacer elements define a second thickness, where the first thickness and the second thickness are each greater than 30 microns.

According to another aspect of the disclosure, a sunroof assembly for a vehicle is provided that comprises an electro-optic assembly.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, or the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An electro-optic assembly comprising:
a first substrate having a first surface and a second surface opposite the first surface;
a second substrate having a third surface and a fourth surface opposite the third surface, the first and second substrates disposed in a parallel and spaced apart relationship so as to define a cavity therebetween, the second and third surfaces facing each other;
a primary seal extending between the first and second substrates, the primary seal defining a fill port for injecting an electro-optic medium, the electro-optic medium located in the cavity and retained in an inboard direction by the primary seal, and a plurality of first spacer elements coupled to the primary seal;
a break wall located in the inboard direction or an outboard direction from the primary seal, the break wall extending between the first and second substrates and generally along the primary seal, the break wall including at least one gap for permitting gas to escape from the primary seal during injection of the electro-optic medium, a plurality of second spacer elements coupled to the break wall; and
a space defined between the primary seal and the break wall in the inboard-outboard directions.

2. The electro-optic assembly of claim 1, wherein an opaque material covers visibility of the primary seal and the break wall in a direction from the second surface opposite the cavity and in a direction from the third surface opposite the cavity.

3. The electro-optic assembly of claim 2, wherein the opaque material is a glass frit.

4. The electro-optic assembly of claim 1, wherein the primary seal comprises a primary seal material and the break wall comprises a break wall material that is the same as the primary seal material.

5. The electro-optic assembly of claim 4, wherein the primary seal material and the break wall material comprise one or more epoxy materials.

6. The electro-optic assembly of claim 1, wherein the first spacer elements define a first thickness and the second spacer elements define a second thickness, wherein the first thickness and the second thickness are each greater than 30 microns.

7. The electro-optic assembly of claim 6, wherein the first thickness and the second thickness are each greater than 350 microns.

8. The electro-optic assembly of claim 6, wherein the first thickness is different than the second thickness.

9. The electro-optic assembly of claim 1, wherein the break wall is substantially continuous except for the at least one gap and defines at least a 90% closed path.

10. The electro-optic assembly of claim 1, wherein the primary seal is located inboard from the break wall and defines a fill port path extending in the outboard direction towards the break wall, the fill port defined by the fill port path.

11. The electro-optic assembly of claim 1, wherein the electro-optic medium comprises:
at least one solvent;
at least one anodic material; and
at least one cathodic material.

12. The electro-optic assembly of claim 1, wherein the primary seal is located outboard from the break wall and the at least one gap includes a plurality of gaps for permitting the electro-optic medium to pass the break wall.

13. The electro-optic assembly of claim 1, wherein the first substrate and the second substrate comprise glass and wherein the primary seal has a coefficient of thermal expansion ("CTE") that is greater than a CTE of the first substrate and the second substrate by a multiple of at least 2.

14. An electro-optic assembly comprising:
a first substantially transparent substrate having a first surface and a second surface opposite the first surface;
a second substantially transparent substrate having a third surface and a fourth surface opposite the third surface, the first and second substrates disposed in a parallel and spaced apart relationship so as to define a cavity therebetween, the second and third surfaces facing each other;
a primary seal extending between the first and second substrates generally along a perimeter of the first and second substrates, an electro-optic medium located in the cavity and retained in an inboard direction by the primary seal, and a plurality of first spacer elements coupled to the primary seal;
a break wall located in the inboard direction or an outboard direction from the primary seal, the break wall extending between the first and second substrates and generally along the perimeter of the first and second substrates, a plurality of second spacer elements coupled to the break wall;
a space defined between the primary seal and the break wall in the inboard-outboard directions and the electro-optic medium is located in the space; and
an opaque material covering visibility of the primary seal and the break wall in a direction from the second surface opposite the cavity or in a direction from the third surface opposite the cavity.

15. An electro-optic assembly of claim 14, wherein the primary seal defines a fill port path defining a fill port and the space is smaller proximate the fill port path.

16. The electro-optic assembly of claim 14, wherein the primary seal defines a first inboard-outboard width and the break wall defines a second inboard-outboard width that is substantially equal to the first inboard-outboard width.

17. The electro-optic assembly of claim 16, wherein the space defines an inboard-outboard width that is greater than the first inboard-outboard width and the second inboard-outboard width, individually.

18. The electro-optic assembly of claim 17, wherein the inboard-outboard width of the space is greater than the first inboard-outboard width and the second inboard-outboard width, in aggregate.

19. An electro-optic assembly comprising:

a first substrate having a first surface and a second surface opposite the first surface;

a second substrate having a third surface and a fourth surface opposite the third surface, the first and second substrates disposed in a parallel and spaced apart relationship so as to define a cavity therebetween, the second and third surfaces facing each other;

a primary seal extending between the first and second substrates generally along a perimeter of the first and second substrates, an electro-optic medium located in the cavity and retained in an inboard direction by the primary seal, and a plurality of first spacer elements coupled to the primary seal;

a break wall located in the inboard direction or an outboard direction from the primary seal, the break wall extending between the first and second substrates and generally along the perimeter of the first and second substrates, a plurality of second spacer elements coupled to the break wall; and wherein the first spacer elements define a first thickness and the second spacer elements define a second thickness, wherein the first thickness and the second thickness are each greater than 30 microns.

20. A sunroof assembly for a vehicle comprising the electro-optic assembly of claim 19.

* * * * *